(12) United States Patent
Nies

(10) Patent No.: US 7,677,075 B2
(45) Date of Patent: Mar. 16, 2010

(54) METHODS AND APPARATUS FOR EVALUATING SENSORS AND/OR FOR CONTROLLING OPERATION OF AN APPARATUS THAT INCLUDES A SENSOR

(75) Inventor: Jaco Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 11/537,197

(22) Filed: Sep. 29, 2006

(65) Prior Publication Data

US 2008/0078228 A1 Apr. 3, 2008

(51) Int. Cl.
*G01D 18/00* (2006.01)
(52) U.S. Cl. ......................................... 73/1.01
(58) Field of Classification Search ........................ None
See application file for complete search history.

(56) References Cited

U.S. PATENT DOCUMENTS

| 4,700,563 | A | * | 10/1987 | Iwata et al. ............... 73/115.02 |
| 5,422,826 | A | | 6/1995 | Cousineau |
| 5,455,781 | A | * | 10/1995 | Reynal et al. ................. 702/82 |
| 7,062,359 | B2 | | 6/2006 | Bjorklund |
| 2004/0134256 | A1 | * | 7/2004 | Herrmann et al. ............ 73/1.59 |
| 2006/0137436 | A1 | * | 6/2006 | Buck et al. ..................... 73/116 |

OTHER PUBLICATIONS

Roland Piquepaille's Technology Trends, pp. 1-4, Jun. 2004; http://radio.weblogs.com/0105910/2004/06/21.html.*

* cited by examiner

*Primary Examiner*—Robert R Raevis
(74) *Attorney, Agent, or Firm*—James McGinness, Esq.; Armstrong Teasdale LLP

(57) ABSTRACT

A method for evaluating sensors includes receiving a first measurement signal from a first sensor configured to measure a parameter relating to a first apparatus, receiving a second measurement signal from a second sensor configured to measure the parameter as the parameter relates to a second apparatus, comparing the first measurement signal with the second measurement signal, and determining at least one of, whether the first measurement signal is inaccurate or the first sensor has failed based, at least in part, on the comparison between the first and second measurement signals.

18 Claims, 5 Drawing Sheets

METHODS AND APPARATUS FOR EVALUATING SENSORS AND/OR FOR CONTROLLING OPERATION OF AN APPARATUS THAT INCLUDES A SENSOR

BACKGROUND OF THE INVENTION

This invention relates generally to sensors, and more specifically to methods and apparatus for evaluating sensors and/or for controlling an apparatus that includes a sensor.

Wind energy is sometimes used to generate electrical power using a wind turbine, wherein an electrical generator is driven by the rotation of a rotor that converts the wind energy into rotational energy. A plurality of wind turbines are sometimes grouped together at power plants, often referred to as wind farms or wind parks. Each wind turbine within a wind farm sometimes includes sensors that measure various parameters relating to operation of the wind turbine. For example, at least some known wind turbines include one or more sensors for measuring an ambient temperature, anemometry for measuring wind direction and/or wind speed, one or more sensors for detecting ice within ambient air and/or on components of the wind turbine, one or more sensors for measuring a yaw position of a rotor of the wind turbine, and/or one or more sensors for measuring a pitch angle of one or more rotor blades of the wind turbine. Based on signals received from the sensors, operation of individual wind turbines within the wind farm can be controlled by control systems on-board the individual wind turbines and/or by a centralized control system of the wind farm. Moreover, the centralized control system may control operation of the wind farm as a whole based on signals from the sensors of individual wind turbines. For example, the centralized control system may control a total power output of the wind farm based on signals received from sensors on individual wind turbines. However, the sensors of individual wind turbines within the wind farm may sometimes transmit inaccurate measurements and/or fail.

BRIEF DESCRIPTION OF THE INVENTION

In one aspect, a method is provided for evaluating sensors. The method includes receiving a first measurement signal from a first sensor configured to measure a parameter relating to a first apparatus, receiving a second measurement signal from a second sensor configured to measure the parameter as the parameter relates to a second apparatus, comparing the first measurement signal with the second measurement signal, and determining at least one of, whether the first measurement signal is inaccurate or the first sensor has failed based, at least in part, on the comparison between the first and second measurement signals.

In another aspect, a method is provided for controlling a first apparatus of a group of a plurality of apparatus. The method includes receiving a first measurement signal from a first sensor configured to measure a parameter relating to a first apparatus of the plurality of apparatus, receiving a second measurement signal from a second sensor configured to measure the parameter as the parameter relates to a second apparatus of the plurality of apparatus, comparing the first measurement signal with the second measurement signal, determining at least one of, whether the first measurement signal is inaccurate or the first sensor has failed based, at least in part, on the comparison between the first and second measurement signals, and controlling operation of the first apparatus based, at least in part, on at least one of the second measurement signal, information relating to ambient conditions adjacent any of the plurality of apparatus, and a third measurement signal received from a third sensor configured to measure the parameter as the parameter relates to a third apparatus of the plurality of apparatus.

In another aspect, a wind farm includes a plurality of wind turbines, a first sensor configured to measure a parameter relating to a first wind turbine of the plurality of wind turbines, a second sensor configured to measure the parameter as the parameter relates to a second wind turbine of the plurality of wind turbines, and a processor coupled to the first and second sensors. The processor is configured to receive a first measurement signal from the first sensor, wherein the first measurement signal is representative of the parameter as the parameter relates to the first wind turbine, and receive a second measurement signal from the second sensor, wherein the second measurement signal is representative of the parameter as the parameter relates to the second wind turbine. The processor is also configured to compare the first measurement signal with the second measurement signal, determine at least one of, whether the first measurement signal is inaccurate or the first sensor has failed based, at least in part, on the comparison between the first and second measurement signals, and control operation of the first wind turbine based, at least in part, on at least one of the second measurement signal, information relating to ambient conditions adjacent any of the plurality of wind turbines, and a third measurement signal received from a third sensor configured to measure the parameter as the parameter relates to a third wind farm of the plurality of wind farms.

BRIEF DESCRIPTION OF THE DRAWINGS

FIG. 4 is a schematic diagram of an exemplary control system for a wind farm, such as, but not limited to, the wind farm shown in FIG. 4.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
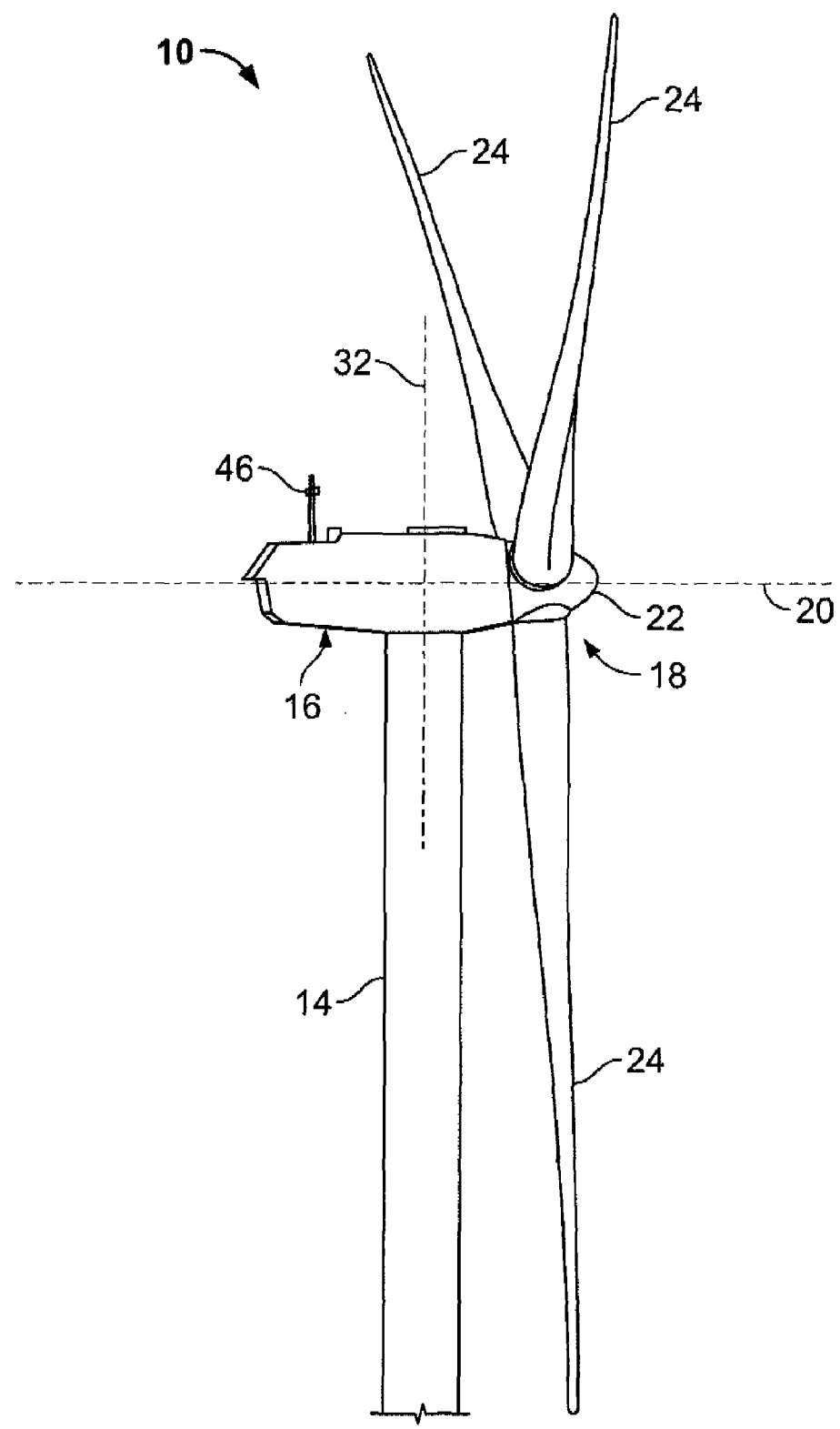
FIG. 1 is a perspective of an exemplary wind turbine.

FIG. 1 is a perspective of an exemplary embodiment of an exemplary wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or its associated components and/or for supplying electrical power generated by wind turbine 10 thereto.

Wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. However, in some embodiments, in addition or alternative to tower-mounted nacelle 16, wind turbine 10 includes a nacelle 16 adjacent the ground and/or a surface of water. The height of tower 14 may be any suitable height enabling wind turbine 10 to function as described herein. Rotor 18 includes a hub 22 and a plurality of blades 24 (sometimes referred to as "airfoils") extending radially outwardly from hub 22 for converting wind energy into rotational energy. Although rotor 18 is described and illustrated herein as having three blades 24, rotor 18 may have any number of blades 24. Blades 24 may each have any length (whether described and/or illustrated herein). For example, in some embodiments one or more rotor blades 24 are about 0.5 meters long, while in some embodiments one or more rotor blades 24 are about 50 meters long. Other examples of blade 24 lengths include 10 meters or less, about 20 meters, about 37 meters, and about 40 meters. Still other examples include rotor blades between about 50 and about 100 meters long.

Despite how rotor blades 24 are illustrated in FIG. 1, rotor 18 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Figure 2:
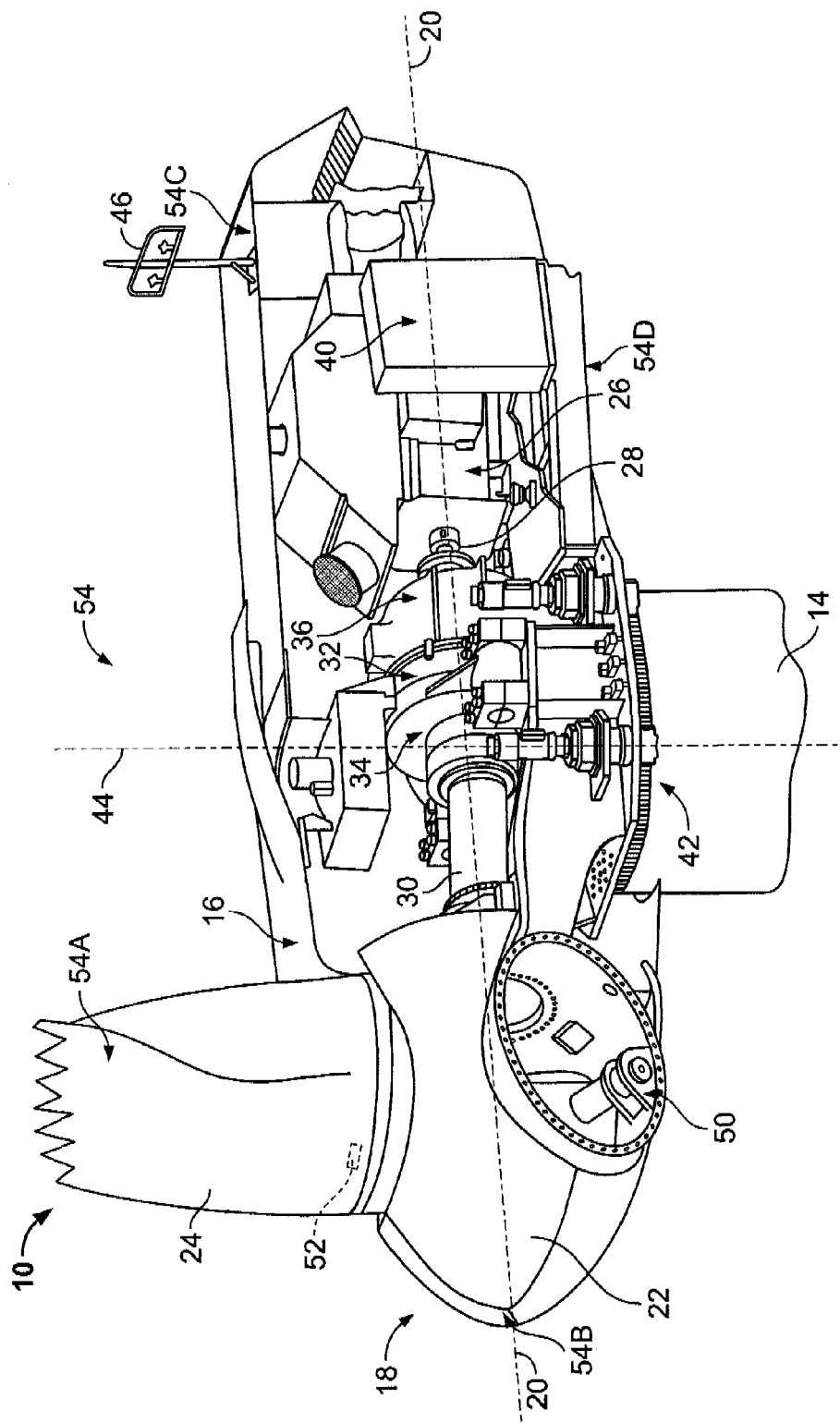
FIG. 2 is a partially cut-away perspective view of a portion of the wind turbine shown in FIG. 1.
Figure 3:
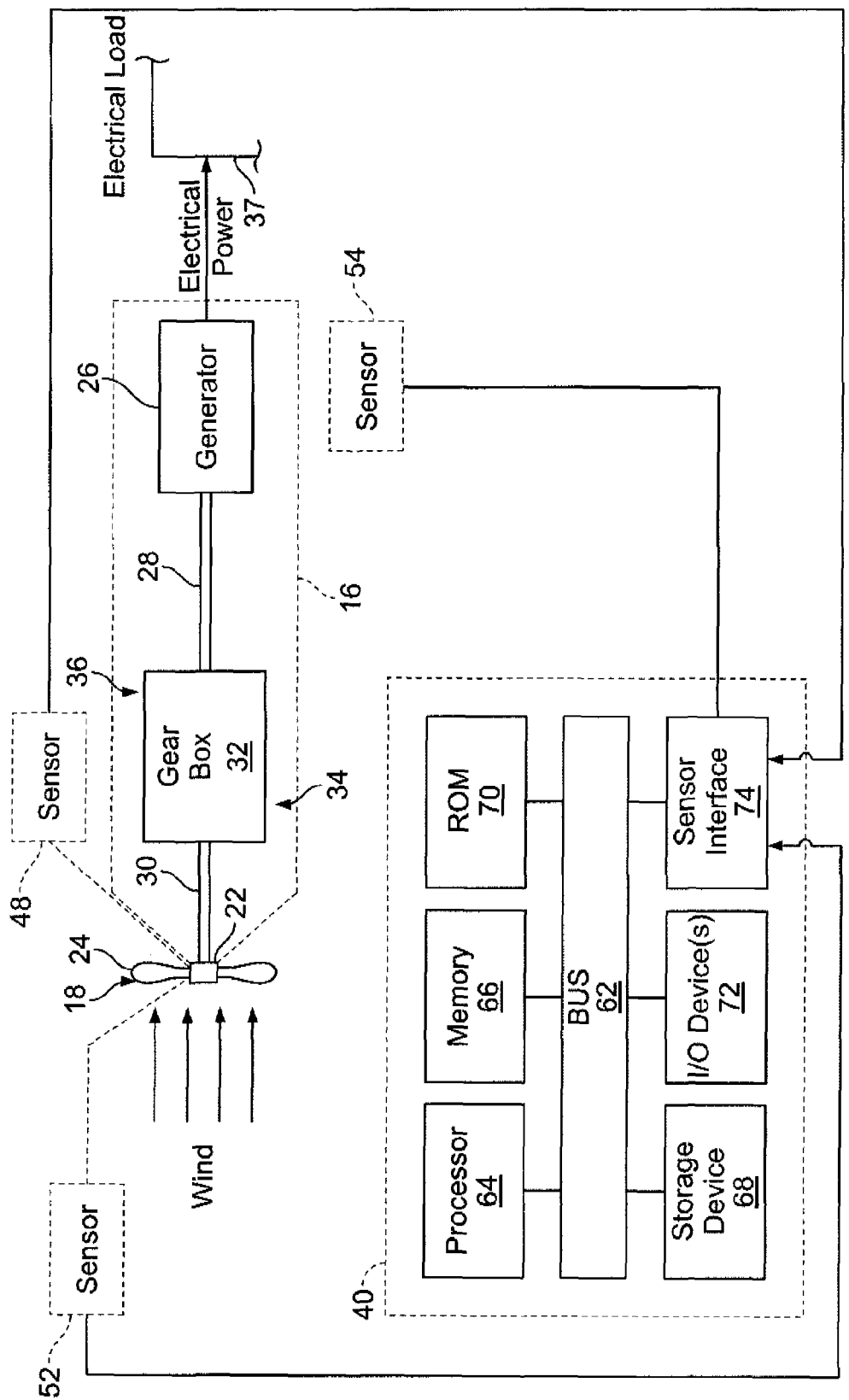
FIG. 3 is a schematic diagram of the wind turbine shown in FIGS. 1 and 2.

Referring now to FIGS. 2 and 3, in the exemplary embodiment, wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine". In the exemplary embodiment, generator rotor shaft 28 is coupled to rotor shaft 30 through a gearbox 32, although in other embodiments generator rotor shaft 28 is coupled directly to rotor shaft 30. More specifically, in the exemplary embodiment gearbox 32 has a low speed side 34 coupled to rotor shaft 30 and a high speed side 36 coupled to generator rotor shaft 28. The torque of rotor 18 drives the generator rotor to thereby generate electrical power from rotation of rotor 18 for delivery to an electrical load 37, such as, but not limited to a power grid (not shown), coupled to generator 26. General operation of the electrical generator to generate electrical power from the rotational energy of rotor 18 is known in the art and therefore will not be described in more detail herein.

In some embodiments, wind turbine 10 may include one or more control systems 40 coupled to some or all of the components of wind turbine 10 for generally controlling operation of wind turbine 10 and/or as some or all of the components thereof (whether such components are described and/or illustrated herein). In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, overall system monitoring and control including, for example, pitch and speed regulation, high-speed shaft and yaw brake application, yaw and pump motor application, and/or fault monitoring. Distributed and/or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44 for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be electrically coupled (for example by cable (not shown) and/or radio frequency) to control system(s) 40 for sending measurements to control system(s) 40 for processing thereof. For example, and although anemometry 46 may be coupled to control system(s) 40 for sending measurements thereto for controlling other operations of wind turbine 10, anemometry 46 may send measurements to control system(s) 40 for controlling and/or changing a yaw of rotor 18 using yaw system 42. Alternatively, anemometry 46 may be coupled directly to yaw system 42 for controlling and/or changing a yaw of rotor 18.

In some embodiments, wind turbine 10 includes one or more sensors 48 coupled to nacelle 16, hub 20, and/or one or more rotor blades 24 for measuring the yaw angle of rotor 18. Sensor(s) 48 may each be any suitable sensor having any suitable location within wind turbine 10, such as, but not limited to, optical encoders within yaw system 42. In some embodiments, sensor(s) 48 are electrically coupled (for example by cable (not shown) and/or radio frequency) to control system(s) 40 for sending yaw measurements to control system(s) 40 for processing thereof.

Wind turbine 10 includes a variable blade pitch system 50 for controlling, including but not limited to changing, a pitch angle of rotor blades 24 with respect to a wind direction. Pitch system 50 may be coupled to control system(s) 40 for control thereby. Pitch system 50 includes one or more actuators (not shown) coupled to hub 22 and blades 24 for changing the pitch angle of blades 24 by rotating blades 24 with respect to hub 22. The pitch actuators may include any suitable structure, configuration, arrangement, means, and/or components, whether described and/or illustrated herein, such as, but not limited to, electrical motors, hydraulic cylinders, springs, and/or servomechansims. Moreover, the pitch actuators may be driven by any suitable means, whether described and/or illustrated herein, such as, but not limited to, hydraulic fluid, electrical power, electro-chemical power, and/or mechanical power, such as, but not limited to, spring force. For example, in some embodiments, the pitch actuators include a pitch drive gear (not shown) that is coupled to a pitch ring gear (not shown). The pitch ring gear is coupled to blade 24 such that rotation of the pitch drive gear rotates blade 24 about an axis of rotation (not shown) to thereby change the pitch of blade 24.

In some embodiments, the pitch actuators may be driven by energy extracted from rotational inertia of rotor 18 and/or a stored energy source (not shown) that supplies components of wind turbine 10, such as, but not limited to, control system(s) 40 and/or pitch system 50, energy during an anomaly in the electrical load and/or power source coupled to wind turbine 10. For example, an anomaly in the electrical load and/or power source may include, but is not limited to, a power failure, an undervoltage condition, an overvoltage condition, and/or an out-of-frequency condition. As such, the stored energy source enables pitching of blades 24 during the anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 10. In some embodiments, the stored energy source stores energy extracted from rotational inertia of rotor 18, energy stored within a frequency converter (not shown), and/or other auxiliary energy sources such as, but not limited to, an auxiliary wind turbine (not shown) coupled to wind turbine 10, solar panels, and/or hydro-power installations.

In some embodiments, wind turbine 10 includes a plurality of sensors 52, each coupled to a corresponding blade 24 for measuring a pitch of each blade 24, or more specifically an angle of each blade 24 with respect to a wind direction and/or with respect to rotor hub 22. Sensors 52 may each be any suitable sensor having any suitable location within wind turbine 10, such as, but not limited to, optical encoders, angular encoders, and linear encoders within pitch system 50. In some embodiments, sensors 52 are electrically coupled (for example by cable (not shown) and/or radio frequency) to control system(s) 40 for sending pitch measurements to control system(s) 40 for processing thereof.

In some embodiments, wind turbine 10 may includes one or more ice detection sensors 54, wherein each of sensors 54 is configured to measure one or more ambient air and/or weather conditions that facilitate detection of ice formation adjacent to wind turbine 10 and/or on components of wind turbine 10. Such ice detection sensors 54 are illustrated in FIG. 2 as sensors 54A, 54B, 54C and 54D. In the exemplary embodiment, sensors 54A are positioned on predetermined portions of blades 24, such portions being typically outboard of sensors 52. Sensors 54A may include, but not be limited to, ice detection sensors, precipitation sensors, humidity sensors, water droplet size sensors, droplet liquid water content sensors, and cameras. In the exemplary embodiment, sensors 54B are positioned near a forward portion of hub 22. Sensors 54B may include, but not be limited to, ambient air temperature sensors, ice detection sensors, precipitation sensors, humidity sensors, water droplet size sensors, droplet liquid water content sensors, and cameras. In the exemplary embodiment, sensors 54C are positioned near anemometry 46. Sensors 54C may include, but not be limited to, ambient air temperature sensors, ice detection sensors, precipitation sensors, humidity sensors, water droplet size sensors, droplet liquid water content sensors, cloud height sensors and cameras. In the exemplary embodiment, sensors 54D are positioned on a lowermost portion of body 16. Sensors 54D may include, but not be limited to, ambient air temperature sensors, humidity sensors, water droplet size sensors, droplet liquid water content sensors, and cameras. Alternatively, sensors 54A, 54B, 54C and 54D are positioned anywhere that facilitates operation of control system(s) 40 as described herein.

In some embodiments, sensor(s) 54 are electrically coupled (for example by cable (not shown) and/or radio frequency) to control system(s) 40 for sending temperature measurements to control system(s) 40 for processing thereof.

In some embodiments, meteorological data similar to that described above may be obtained and imported into control system(s) 40 from a variety of sources that include, but are not limited to, on site and off-site meteorological masts, remote weather stations, and commercially available weather forecast sources (neither shown).

Wind turbine 10 may also include one or more other sensors (not shown) coupled to one or more components of wind turbine 10 and/or the electrical load, whether such component(s) are described or illustrated herein, for measuring parameters of such component(s). Such other sensor(s) may include, but are not limited to, sensors configured to measure displacements, yaw, pitch, loads, moments, strain, stress, twist, damage, failure, rotor torque, rotor speed, an anomaly in the electrical load, and/or an anomaly of power supplied to any component of wind turbine 10. Such other sensors may electrically couple (for example by cable (not shown) and/or radio frequency) to any component of wind turbine 10 and/or the electrical load at any location thereof for measuring any parameter thereof, whether such component, location, and/or parameter is described and/or illustrated herein.

As shown in FIG. 3, and in the exemplary embodiment, control system(s) 40 include at least one bus 62 to facilitate communication of information within control system(s) 40. Alternatively, any other communications device that facilitates operation of control system(s) 40 as described herein is used. One or more processor(s) 64 may be coupled to bus 62 to process information, including information from anemometry 46, yaw system 42, pitch system 50, sensors 48, 52, and/or 54, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 40 may also include a sensor interface 74 that allows control system(s) 40 to communicate with anemometry 46, yaw system 42, pitch system 50, sensors 48, 52, and/or 54, and/or other sensor(s). Sensor interface 74 can be or can include, for example, one or more analog-to-digital converters that convert analog signals into digital signals that can be used by processor(s) 64.

Figure 4:
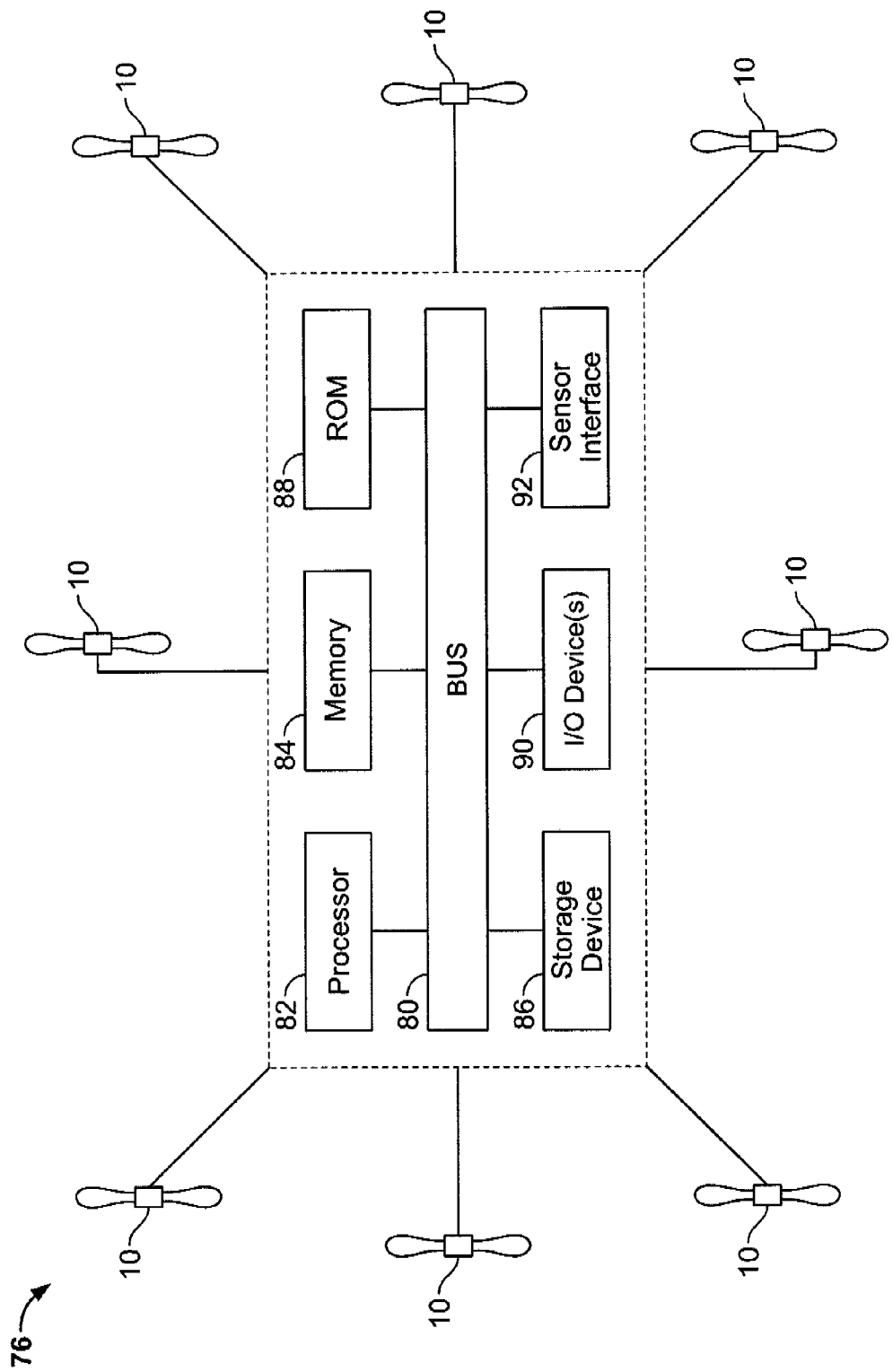
FIG. 4 is a schematic diagram of an exemplary wind farm including a group of a plurality of wind turbines, such as, but not limited to, the wind turbine shown in FIGS. 1-3.

Although only one wind turbine 10 is shown in FIGS. 1, 2 and 3, in some embodiments, a plurality of wind turbines 10 may be grouped together into a wind farm 76, sometimes also referred to as a "wind park", as shown in FIG. 4. Although eight wind turbines 10 are illustrated in FIG. 4, wind farm 76 may include any number of wind turbines 10. Moreover, each wind farm 76 may include a plurality of "sub-parks" (not shown) that include a plurality of wind turbines 10. For example, wind farm 76 may include three sub-parks wherein the sub-parks include 2, 3 and 5 wind turbines 10, respectively, for a total of 10 wind turbines 10. Furthermore, a plurality of such wind farms 76 may be associated with a particular substation (not shown) to form a regional wind farm (not shown).

Each wind turbine 10 may be located any distance from other wind turbines 10. For example, in some embodiments one or more wind turbines 10 are remote from one or more other wind turbines 10. As used herein, the term "remote" is intended to mean separated by a distance of at least ten feet. In some embodiments, wind farm 76 includes one or more centralized control systems 78 for controlling one or more wind turbines 10. Control system(s) 78 may control one or more wind turbines 10 separately and/or in conjunction with one or more control systems 40 (shown in FIGS. 2 and 3). Control system(s) 78 may be electrically coupled (for example by cable (not shown) and/or radio frequency) to control system(s) 40, anemometry 46, yaw system 42, pitch system 50, sensor(s) 48, 52, and/or 54, and/or other sensor(s) of one or more wind turbines 10 for receiving information therefrom, sending information thereto, controlling operation thereof, and/or for generally controlling operation of one or more wind turbines 10. In the exemplary embodiment, any number of wind turbines 10 and wind farms 76, in any configuration, in any region, separated by any distance, may be operated and controlled as described herein. For example, at least one wind farm 76 may be located off-shore and at least one wind farm 76 may be located on a hillside in a rural setting.

In some embodiments, control system(s) 78 may include a bus 80 and/or other communications device to communicate information. One or more processor(s) 82 may be coupled to bus 80 to process information, including information from anemometry 46, yaw system 42, pitch system 50, sensors 48, 52, and/or 54, and/or other sensor(s). Control system(s) 78 may also include one or more random access memories (RAM) 84 and/or other storage device(s) 86. RAM(s) 84 and storage device(s) 86 are coupled to bus 80 to store and transfer information and instructions to be executed by processor(s) 82. RAM(s) 84 (and/or also storage device(s) 86, if included) can also be used to store temporary variables or other intermediate information during execution of instructions by processor(s) 82. Control system(s) 78 may also include one or more read only memories (ROM) 88 and/or other static storage devices coupled to bus 80 to store and provide static (i.e., non-changing) information and instructions to processor(s) 82. Input/output device(s) 90 may include any device known in the art to provide input data to control system(s) 78 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 78 may also include a sensor interface 92 that allows control system(s) 78 to communicate with anemometry 46, yaw system 42, pitch system 50, sensors 48, 52, and/or 54, and/or other sensor(s). Sensor interface 92 can be or can include, for example, one or more analog-to-digital converters that convert analog signals into digital signals that can be used by processor(s) 82.

Figure 5:
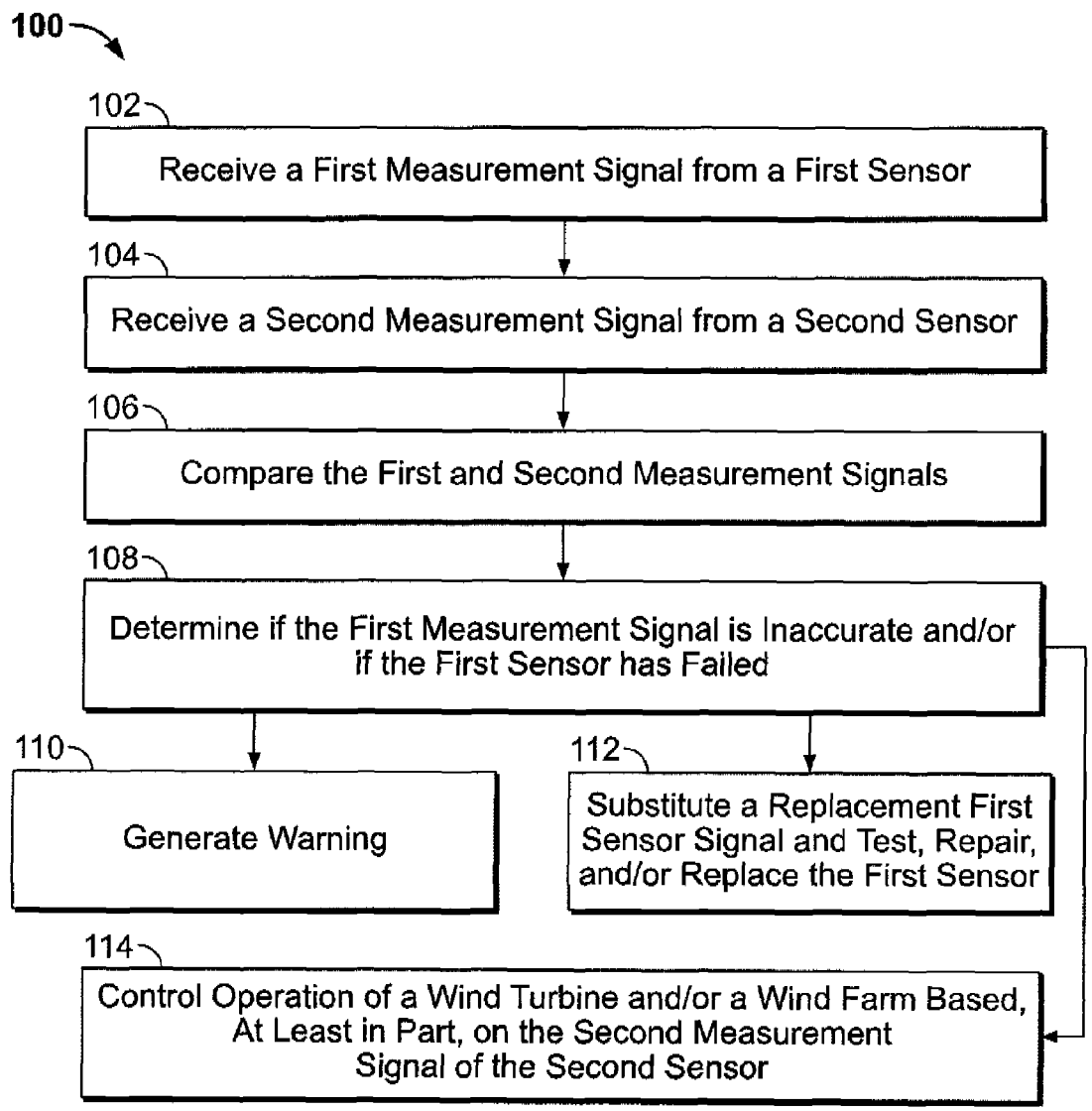
FIG. 5 is a flowchart illustrating an exemplary embodiment of a method for evaluating sensors and/or controlling one or more apparatus of a group of a plurality of the apparatus, such as, but not limited to, one or more of the wind turbines shown in FIGS. 1-4 of the wind farm shown in FIG. 4.

FIG. 5 is a flowchart illustrating an exemplary embodiment of a method 100 for evaluating sensors, such as, but not limited to, anemometry 46, sensors 48, 52, and/or 54 (shown in FIGS. 2 and 3), and/or other sensors, and/or for controlling one or more apparatus of a group of apparatus, such as, but not limited to, one or more wind turbines 10 (shown in FIGS. 1-4) of wind farm 76 (shown in FIG. 4). Although method 100 may be used to control any apparatus of a group of apparatus, method 100 will be described and illustrated herein with respect to controlling one or more wind turbines 10 of wind farm 76.

Method 100 includes receiving 102 a first measurement signal from a first sensor that measures a parameter relating to one of wind turbines 10 in wind farm 76, such as, but not limited to, anemometry 46, sensor(s) 48, 52, and/or 54 (shown in FIGS. 2 and 3), and/or other sensors of a first wind turbine 10 in wind farm 76. The measured parameter may be any parameter relating to any wind turbine 10 in wind farm 76 and/or any parameter relating to wind farm 76, such as, but not limited to, an ambient temperature, a wind direction, a wind speed, formation of ice, precipitation, humidity, water droplet size, droplet liquid water content, cloud height, a yaw angle, and a pitch angle. Method 100 also includes receiving 104 a second measurement signal from a sensor of a different, or second, wind turbine 10 in wind farm 76 that measures the same parameter as the first sensor as the parameter relates to the second wind turbine 10, such as, but not limited to, anemometry 46 sensor(s) 48, 52, and/or 54, and/or other sensors of the second wind turbine 10 in wind farm 76. The first and second measurement signals are then compared 106, and based at least in part on the comparison 106, it is determined 108 if the first measurement signal is inaccurate and/or if the first sensor has failed. The comparison 106 thus allows the sensors to be compared against each other to determine if one of the sensors is not outputting accurate measurements, whether because the results are inaccurate and/or the sensor is not outputting a result because it has failed. In some embodiments, other factors in addition or alternative to the comparison 106 may be used to determine 108 if a sensor is inaccurately measuring its corresponding parameter(s) and/or has failed. For example, in some embodiments, information relating to ambient conditions adjacent any of wind turbines 10 in wind farm 76 and/or measurement signals from any other sensor(s) in wind farm 76, such as, but not limited to, anemometry 46, sensor(s) 48, 52, and/or 54, other sensors of any wind turbine 10 in wind farm 76, and/or other sensors in wind farm 76 may be used to determine 108 if a sensor is inaccurately measuring its corresponding parameter(s) and/or has failed.

In some embodiments, if it determined 108 that a sensor is inaccurately measuring its corresponding parameter(s) and/or has failed, method 100 may include generating 110 a warning that the sensor is inaccurately measuring its corresponding parameter(s) and/or the sensor has failed. Based, at least in part, on the generated 110 warning, the sensor may be tested, repaired, and/or replaced 112.

Moreover, in some embodiments, method 100 includes controlling 114 operation of the wind turbine(s) 10 having the first sensor, i.e., the sensor that is inaccurately measuring its corresponding parameter(s) and/or has failed based, at least in part, on the second measurement signal from the second sensor of the second wind turbine 10, information relating to ambient conditions adjacent any of the plurality of wind turbines 10 in wind farm 76, any other measurement signal(s) received from one or more sensors of other wind turbines 10, and/or any other measurement signal(s) received from other sensors of the first wind turbine 10. As such, the use of the measured parameter(s) as it relates to other wind turbines 10 in the farm 76, information from other sensors measuring other parameters, and/or general information about wind farm 76 can be used to compensate for the inaccurate measurement signal of the first sensor and/or failure of the first sensor to control operation of the first wind turbine 10, i.e. the wind turbine having the sensor that is inaccurately measuring its corresponding parameter(s) and/or has failed. Furthermore, controlling 114 operation of wind turbine 10 may include limiting a range of operation of affected wind turbine 10 and/or reschedule power generating availability for affected wind turbine 10 and associated wind turbines 10 in wind farm 76. For example, loss of a particular sensor 54 may necessitate removing affected wind turbine 10 from service and adjust a load scheduling of at least one of the remaining wind turbines 10 in wind farm 76 to compensate for the loss of affected wind turbine 10.

Method 100 may be expanded to include more than two of any one sensor. For example, if wind farm 76 includes forty ambient air temperature measurement sensors (not shown) and one of the forty sensors exceeds a predetermined deviation parameter, subsequent fault identification and remedial actions are facilitated.

The herein-described and/or illustrated embodiments are cost-effective and efficient for evaluating sensors and/or controlling operation of one or more apparatus of a group of a plurality of apparatus. For example, by comparing measurement signals from two different sensors each configured to measure the same parameter as it relates to two different apparatus in the group, the embodiments described and/or illustrated may facilitate evaluating the accuracy of one of the sensors. Moreover, information from the other sensor, i.e. the use of the measured parameter(s) as it relates to one or more other apparatus in the group, information from other sensors measuring other parameters, and/or general information about the group can be used to compensate for the inaccurate measurement signal and/or failure of the sensor to control operation of the apparatus having the sensor that is inaccurately measuring its corresponding parameter(s) and/or has failed.

Although the embodiments described and/or illustrated herein are described and/or illustrated with respect to wind turbines and wind farms, practice of the embodiments described and/or illustrated herein is not limited to wind turbines, wind farms, nor sensors used with wind turbines and/or wind farms. Rather, the embodiments described and/or illustrated herein are applicable to evaluating any type of sensor and/or to controlling any apparatus of a group of a plurality of apparatus.

Exemplary embodiments are described and/or illustrated herein in detail. The embodiments are not limited to the specific embodiments described herein, but rather, components and steps of each embodiment may be utilized independently and separately from other components and steps described herein. Each component, and each step, can also be used in combination with other components and/or method steps.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for evaluating sensors, said method comprising:
   receiving a first measurement signal from a first sensor configured to measure a parameter relating to a first apparatus;
   receiving a second measurement signal from a second sensor configured to measure the parameter as the parameter relates to a second apparatus, the first apparatus and the second apparatus including a plurality of wind turbines grouped together into a wind farm;
   comparing the first measurement signal with the second measurement signal; and
   determining at least one of whether the first measurement signal is inaccurate and that the first sensor has failed based, at least in part, on the comparison between the first and second measurement signals.

2. A method in accordance with claim 1 further comprising generating a warning that at least one of the first measurement signal is inaccurate or the first sensor has failed based on the determination whether at least one of the first measurement signal is inaccurate or that the first sensor has failed.

3. A method in accordance with claim 2 further comprising at least one of the following based on the generated warning:
   testing the first sensor;
   repairing the first sensor;
   replacing the first sensor; and
   substituting a replacement first sensor signal.

4. A method in accordance with claim 1 wherein the first and second apparatus are separated by distance of at least ten feet.

5. A method in accordance with claim 1 wherein determining at least one of, whether the first measurement signal is inaccurate or that the first sensor has failed is in part based on at least one of information relating to ambient conditions adjacent any of the first and second apparatus and a third measurement signal received from a third sensor configured to measure the parameter as the parameter relates to a third apparatus.

6. A method in accordance with claim 1 wherein the parameter is at least one an ambient temperature, a wind direction, a wind speed, formation of ice, a yaw angle, and a pitch angle.

7. A method for controlling a first apparatus of a group of a plurality of apparatus, said method comprising:
receiving a first measurement signal from a first sensor configured to measure a parameter relating to a first apparatus of the plurality of apparatus, the plurality of apparatus including a plurality of wind turbines grouped together into a wind farm;
receiving a second measurement signal from a second sensor configured to measure the parameter as the parameter relates to a second apparatus of the plurality of apparatus;
comparing the first measurement signal with the second measurement signal;
determining at least one of whether the first measurement signal is inaccurate and the first sensor has failed based, at least in part, on the comparison between the first and second measurement signals; and
controlling operation of the first apparatus based, at least in part, on at least one of the second measurement signal, information relating to ambient conditions adjacent any of the plurality of apparatus, and a third measurement signal received from a third sensor configured to measure the parameter as the parameter relates to a third apparatus of the plurality of apparatus.

8. A method in accordance with claim 7 further comprising generating a warning that at least one of the first measurement signal is inaccurate or the first sensor has failed based on the determination that at least one of the first measurement signal is inaccurate and that the first sensor has failed.

9. A method in accordance with claim 8 further comprising at least one of the following based on the generated warning:
testing the first sensor;
repairing the first sensor;
replacing the first sensor; and
substituting a replacement first sensor signal.

10. A method in accordance with claim 7 wherein the first and second apparatus are separated by distance of at least ten feet.

11. A method in accordance with claim 7 wherein determining at least one of, whether the first measurement signal is inaccurate or that the first sensor has failed is in part based on at least one of information relating to ambient conditions adjacent any of the first and second apparatus and a third measurement signal received from a third sensor configured to measure the parameter as the parameter relates to a third apparatus of the plurality of apparatus.

12. A method in accordance with claim 7 wherein the parameter is at least one an ambient temperature, a wind direction, a wind speed, formation of ice, a yaw angle, and a pitch angle.

13. A wind farm comprising:
a plurality of wind turbines;
a first sensor configured to measure a parameter relating to a first wind turbine of said plurality of wind turbines;
a second sensor configured to measure the parameter as the parameter relates to a second wind turbine of said plurality of wind turbines; and
a processor coupled to said first and second sensors, said processor configured to:
receive a first measurement signal from said first sensor, wherein said first measurement signal is representative of the parameter as the parameter relates to said first wind turbine;
receive a second measurement signal from said second sensor, wherein said second measurement signal is representative of the parameter as the parameter relates to said second wind turbine;
comparing said first measurement signal with said second measurement signal;
determine at least one of whether the first measurement signal is inaccurate and said first sensor has failed based, at least in part, on the comparison between said first and second measurement signals; and
control operation of said first wind turbine based, at least in part, on at least one of said second measurement signal, information relating to ambient conditions adjacent any of said plurality of wind turbines, and a third measurement signal received from a third sensor configured to measure the parameter as the parameter relates to a third wind turbine of said plurality of wind turbines.

14. A wind farm in accordance with claim 13 wherein said processor is configured to generating a warning that at least one of said first measurement signal is inaccurate or said first sensor has failed based on the determination that at least one of said first measurement signal is inaccurate and that said first sensor has failed.

15. A wind farm in accordance with claim 13 wherein each of said plurality of wind turbines is separated from every other wind turbine of said plurality of wind turbines by distance of at least ten feet.

16. A wind farm in accordance with claim 13 wherein said processor is configured to determine at least one of, whether said first measurement signal is inaccurate or that said first sensor has failed is in part based on at least one of information relating to ambient conditions adjacent any of said plurality of wind turbines and a third measurement signal received from a third sensor configured to measure the parameter as the parameter relates to a third wind turbine of said plurality of wind turbines.

17. A wind farm in accordance with claim 13 wherein the parameter is at least one of an ambient temperature, a wind direction, a wind speed, formation of ice, a yaw angle, and a pitch angle, said first and second measurement signals are obtained from at least one of:
a sensor configured to measure the ambient temperature;
anemometry configured to measure at least one of the wind direction and the wind speed;
local and remote meteorological masts;
local and remote weather forecasts;
a sensor configured to detect ice;
a sensor configured to measure the yaw angle of a rotor of one of said first and second wind turbines; and
a sensor configured to measure the pitch angle of a rotor blade of one of said first and second wind turbines.

18. A wind farm in accordance with claim 13 wherein said first sensor is coupled to said first wind turbine and said second sensor is coupled to said second wind turbine.

* * * * *